United States Patent [19]
Rosa

[11] 4,255,784
[45] Mar. 10, 1981

[54] TRANSFORMER-RECTIFIER APPARATUS

[75] Inventor: John Rosa, Pittsburgh, Pa.

[73] Assignee: Westinghouse Electric Corp., Pittsburgh, Pa.

[21] Appl. No.: 92,867

[22] Filed: Nov. 8, 1979

[51] Int. Cl.³ .......................................... H02M 7/155
[52] U.S. Cl. ................................................. 363/129
[58] Field of Search ............... 363/125, 126, 128, 129

[56] References Cited

U.S. PATENT DOCUMENTS

| | | | |
|---|---|---|---|
| Re. 25,000 | 6/1961 | Michaelis | 363/67 |
| 1,712,491 | 5/1929 | Darrieus | 363/3 |
| 3,008,080 | 11/1961 | Storsand | 363/126 |
| 3,089,074 | 5/1963 | Vaughan | 363/126 |
| 3,098,963 | 7/1963 | Michaelis | 363/125 X |
| 3,585,484 | 6/1971 | Dortort | 323/48 X |
| 4,156,897 | 5/1979 | Vigh et al. | 363/126 |
| 4,208,709 | 6/1980 | Garnham et al. | 323/48 X |

FOREIGN PATENT DOCUMENTS 1254425  11/1971  United Kingdom ..................... 363/126

*Primary Examiner*—William M. Shoop
*Attorney, Agent, or Firm*—C. M. Lorin

[57] ABSTRACT

A three-phase transformer having a delta-connected primary and two identical secondary windings per phase connected in hexagon, has symmetrical taps on each secondary winding connected to rectifying devices for generating DC energy from a first group of six symmetrical AC voltages at 60° with respect to the virtual neutral for one polarity and from a second group of six symmetrical AC voltages at 60° with respect to the virtual neutral for the other polarity, the first and second groups being at 30° phase shift to one another.

13 Claims, 5 Drawing Figures

TRANSFORMER-RECTIFIER APPARATUS

BACKGROUND OF THE INVENTION

The invention relates to apparatus for the conversion of alternating current (AC) to direct current (DC) under low voltage and high power rating as applicable for electrolysis DC power supply, or to aluminum melting, for instance. The technique used generally combines a transformer and a rectifying circuit connected to the secondary of the transformer. Low voltage and high currents impose limitations in the design of the basic transformer, in particular relatively few secondary turns are used to provide a low voltage and multiple windings are required which are associated with an array of rectifier devices in order to reduce ripple. More particularly, with a threephase AC power supply, it is customary to look for a 12-pulse rectifying system.

A perfect 12-pulse rectifying system does not associate naturally with multiple secondary windings of a transformer. The prior art has not been able to achieve such a system with good symmetry because a distributed vectorial representation of the twelve AC phases at the input of the rectifying circuit has been obtained by a transformer construction in which the required turns ratios are hard to implement and leakage reactances are difficult to match. In addition, the required reduction of harmonics necessitates the use of interphase reactors.

An object of the present invention is to realize a nearly ideal multi-winding transformer-rectifier apparatus for low voltage and high current.

SUMMARY OF THE INVENTION

The transformer-rectifier apparatus according to the present invention overcomes the shortcomings of the prior art in that the secondary windings are connected to form a regular hexagon. Each phase has identical twin secondary windings each having two taps for the rectifier devices. The voltages appearing on these taps are evenly disposed from one tap to the next about the virtual neutral point at the center of the hexagon. With a threephase delta-connected primary and the three pairs of identical secondary windings associated with the respective primary windings, each primary winding can be sandwiched between the secondary windings of one pair, thereby resulting in well-matched voltages and leakage reactances, while the hexagonal disposition of the secondary windings includes two tapped connections per winding to two rectifier devices for the respective polarities of the DC output terminals. Under such arrangement, the vectorial displacement is 30° between consecutive taps of the hexagon, resulting in the same displacement between the positive and negative sets of pulses, while the conduction angle of a rectifier device in each set is 60°. This corresponds for the tapped section to a turns ratio of tangent 15° relative to the winding total number of turns. A close approximation of such ideal ratio can be achieved despite the small number of turns in such low voltage, high rating transformer-rectifier apparatus.

DESCRIPTION OF TWO TWELVE-PULSE TRANSFORMER-RECTIFIER SYSTEMS OF THE PRIOR ART

Figure 1:
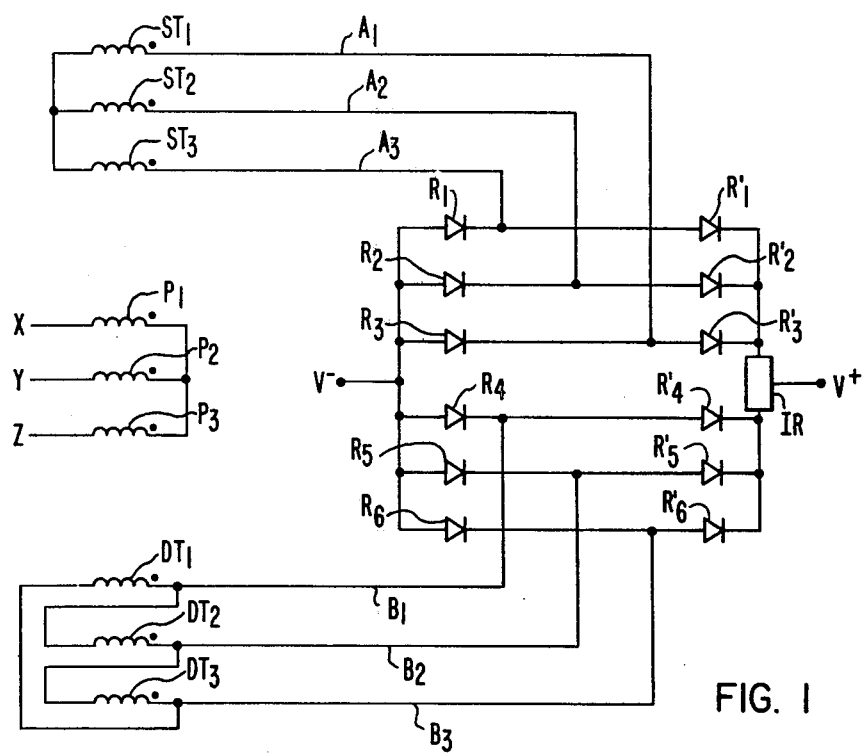
FIG. 1 shows a twelve-pulse transformer-rectifier system of the prior art of the star-delta type.

Several attempts have been made to generate directcurrent under low voltage and high currents by conversion of a three-phase power system through a transformer into twelve phases connected to an array of twelve rectifier devices distributed equally. A typical first solution is illustrated by FIG. 1. The transformer includes three primary windings $P_1$, $P_2$, $P_3$ arranged in a star-connection. From this primary system, two three-phase secondary systems are derived which are at 30° phase shift to one another. The phase shift results from having one secondary star-connected ($ST_1$, $ST_2$, $ST_3$), the other delta-connected ($DT_1$, $DT_2$, $DT_3$). However, this also requires that the windings from the first system to the second be in a $1/\sqrt{3}$ ratio, in order to have the same vectorial magnitude in both secondary systems. With such arrangement, as shown in FIG. 1, six pairs of series-connected rectifiers ($R_1$, $R_1'$) . . . ($R_6$, $R_6'$) are connected between positive and negative busses of the DC output ($+V$, $-V$). The middle points of these pairs are connected to the respective AC terminals ($A_1$–$A_3$) for one set, ($B_1$–$B_3$) for the second set. An interphase reactor IR is connected between the two sets of rectifiers, to support the instantaneous voltage ripple difference between the DC outputs from the two groups of secondary windings.

This system has several serious shortcomings. First, since the two groups of windings must have turns in the ratio of $\sqrt{3}$ to 1, which is an irrational number, an exact ratio of winding turns is unattainable, while at low voltages, due to the relatively high volts/turn typical of a transformer of 100 KVA, or larger rating, the turns ratio cannot be approximated with good accuracy. As a result, distortion components are introduced in the output voltage and input line currents which defeat the very purpose of a symmetrical 12-pulse system. Secondly, the two groups of secondary windings inherently have different voltages and are rated for different currents, since one is delta-connected, the other star-connected. Accordingly, it is difficult to match their leakage reactances. Again, this results in non-canonical distortion components. Thirdly, this system requires an interphase reactor, which takes place and adds to the cost and losses.

Figure 2A:
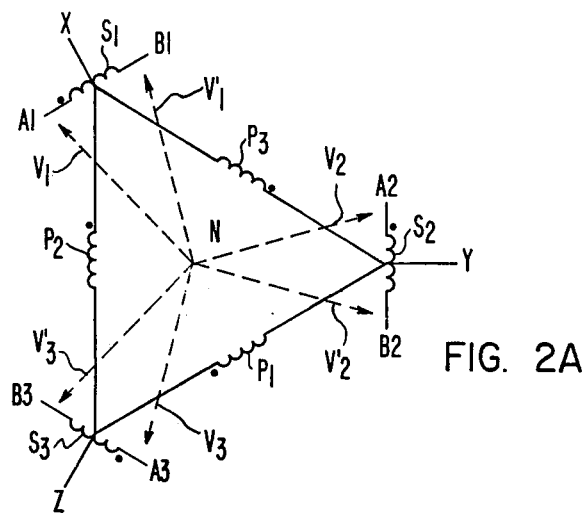
FIGS. 2A and 2B together show a symmetrical arrangement of the prior art providing a twelve-pulse transformer-rectifier system.
Figure 2B:
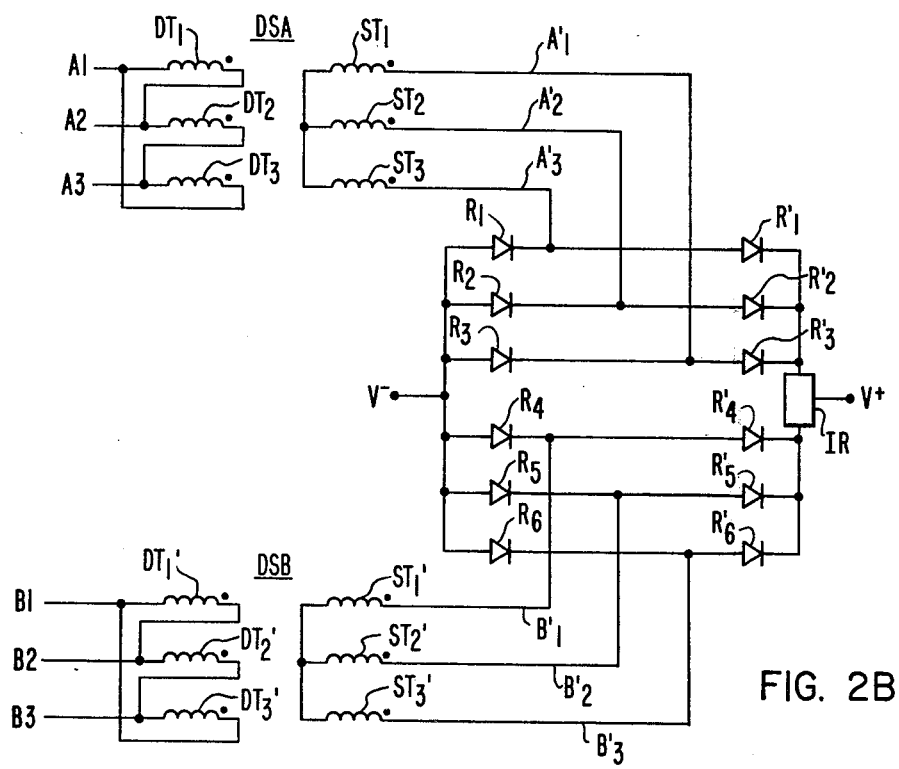

Referring to FIGS. 2A and 2B, another prior art 12-pulse rectifier system is shown which tends, through increased complexity, to achieve a more symmetrical arrangement than the one of FIG. 1. The three lines XYZ of a three-phase system are, first, connected to a delta arrangement of three primary windings $P_1$, $P_2$, $P_3$, and secondly to the central taps of three identical secondary windings $S_1$, $S_2$, $S_3$. The latter are given a properly selected turns ratio and are respectively electromagnetically coupled to the primary windings $P_1$, $P_2$, $P_3$. The outside terminals of $S_1$, $S_2$, $S_3$ are connected, on one side ($A_1$, $A_2$, $A_3$), to the primary side of a delta-star transformer DSA and, on the other side ($B_1$, $B_2$, $B_3$), to the primary side of another and identical delta-star transformer DSB. From a consideration of FIG. 2A, it is seen that, with a proper turns ratio, outside terminals $A_1$, $A_2$, $A_3$ of $S_1$, $S_2$, $S_3$, respectively, vectorially form about the virtual neutral point a group of three vectors $V_1$, $V_2$, $V_3$ displaced at 60° to each other, while outside terminals $B_1$, $B_2$, $B_3$ form an identical group of three vectors $V_1'$, $V_2'$, $V_3'$, but at a 30° phase shift to the first. These vectorial relations are respected by transformers DSA and DSB, so that, the arrangement provides a totally symmetrical disposition at the secondary terminals $A_1'$, $A_2'$, $A_3'$, $B_1'$, $B_2'$, $B_3'$ of transformers DSA, DSB. With the same rectifier arrangement on the DC side as in FIG. 1, it appears that the desired result is achieved with considerably more complexity, bulkiness and cost since not less than six windings are required, as shown in FIG. 2A and six more, mainly ($DT_1$–$DT_3$), ($ST_1$–$ST_3$) for transformer DSA, and ($DT_1'$–$DT_3'$), ($ST_1'$, $ST_3'$) for transformer DSB. Also, an interphase reactor is still required with such grouping of rectifiers ($R_1$—$R_1'$)-($R_3'$—$R_3'$) and ($R_4$, $R_4'$)-($R_6$—$R_6'$).

Figure 3:
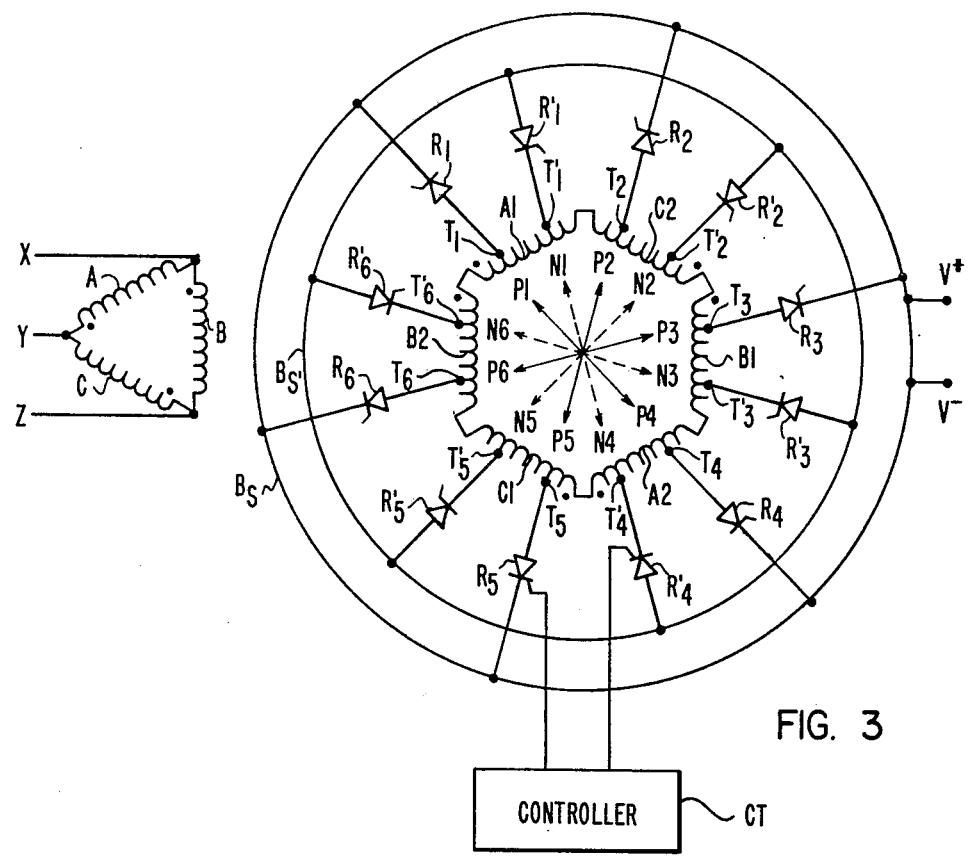
FIG. 3 schematically represents the symmetrical twelve-pulse transformer-rectifier system according to the present invention.
Figure 4:
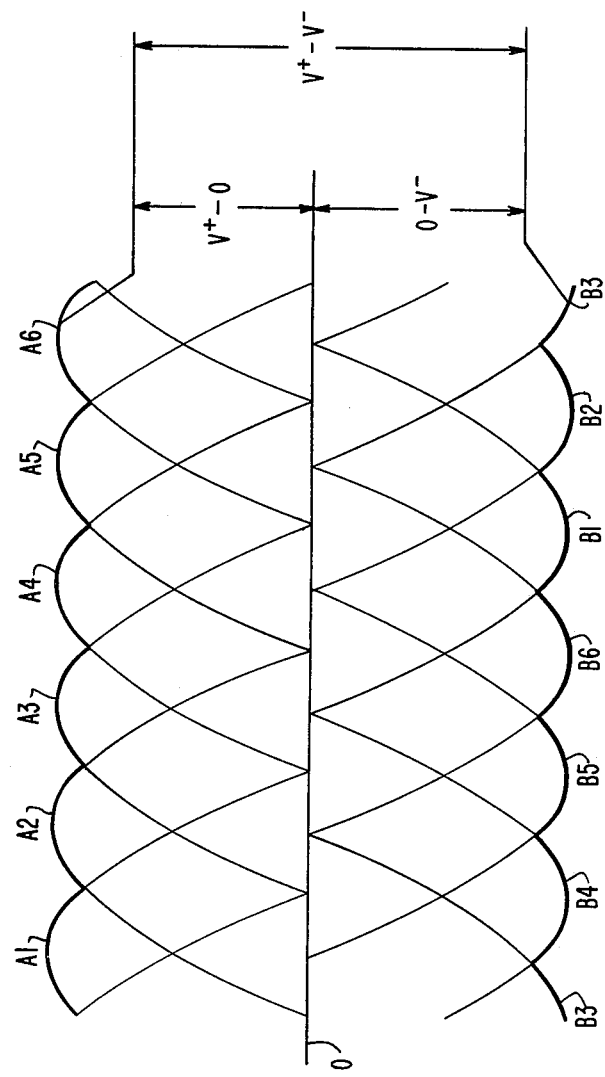
FIG. 4 is a voltage output of the twelve-pulse transformer-rectifier system of FIG. 3 using diodes, or thyristors fired at zero degree angle.
Figure 5:
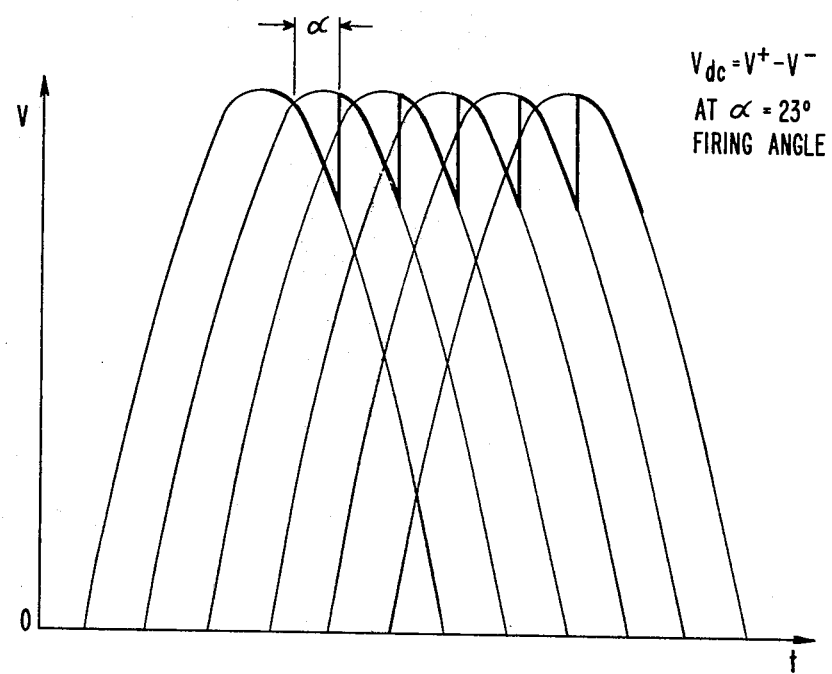
FIG. 5 shows the voltage output of the twelve-pulse transformer-rectifier-system of FIG. 3 using thyristors fired at a particular angle.

Referring to FIG. 3, the apparatus according to the invention is shown to include a delta-connected primary having windings A, B, C, and a secondary having twice the number of windings connected end-to-end so as to form a hexagon. The six secondary windings are electromagnetically coupled in pairs to a corresponding one of the windings of the primary. Thus, $A_1$ and $A_2$ correspond on the hexagon to winding A, $B_1$ and $B_2$ to winding B and $C_1$ and $C_2$ correspond to winding C. Six rectifier devices, illustrated on FIG. 3 as thyristors $R_1$, $R_1'$ ... $R_6$, $R_6'$, are connected to taps on the respective secondary windings which result in voltages displaced at 30° angles with respect to the virtual neutral 0, which is assumed to be at the center of the hexagon. The two taps per winding are shown as ($T_1$, $T_1'$), on winding $A_1$, ($T_2$, $T_2'$) on winding $C_2$, ($T_3$, $T_3'$) on winding $B_1$, and so on. Rectifier $R_1$ connects tap $T_1$ to the positive bus BS of the DC output. $R_1'$ connects tap $T_1'$ to the negative bus BS', and so on from winding to winding on the hexagon. As shown in FIG. 3, about the neutral point at the center of the hexagon, two vectorial electrical systems $P_1$, $P_2$, ... $P_6$ and $N_1$, $N_2$, ... $N_6$ are formed by the winding taps which are at 30° phase shift, each electrical system forming six symmetrical AC voltages which are 60° displaced with respect to the virtual neutral point. FIG. 4 shows the positive and negative bus potentials with respect to the virtual neutral 0 at full conduction (e.g. firing angle $\alpha = 0$). As shown in FIG. 4, the positive going rectifier devices ($R_1$, $R_2$ ... $R_6$) provide a 6-pulse DC potential V+ with respect to the virtual neutral ($P_1$, $P_2$ ... $P_6$) while the negative going rectifier devices ($R_1'$, $R_2'$, ... $R_6'$) provide a 6-pulse DC potential V− with respect to the virtual neutral ($N_1$, $N_2$ ... $N_6$). The 6-pulse ripple contour due to windings on the positive side is at 30° phase shift of the 6-pulse ripple contour due to windings on the negative side. Therefore, the V+ V− DC voltage has a 12-pulse ripple which does not require any interphase reactor. With proper firing angle control from controller CT, the conventional "chopped" waveform typical of a 12-pulse system is obtained. The voltage appearing between the positive and negative terminals for such a case is shown by FIG. 5, for $\alpha = 23°$ resulting in 92% of maximum DC output voltage. Although the rectifier devices $R_1$, $R_1'$ ... $R_6$, $R_6'$, have been shown to be thyristors, it is understood that diodes instead of thyristors, could also be acceptable in the rectifying process, if voltage control is not required.

In a perfect 12-pulse scheme like FIG. 2, or FIG. 3, the theoretical harmonic spectrum of the primary line currents is determined. The lowest harmonics present are of the 11th and 13th order. Whenever the system is not perfectly symmetrical like in FIG. 1, or in FIG. 4 when the taps do not embrace the right fraction tan 15° = 0.267969 (which is the turns ratio of the tapped winding segment to the entire secondary winding) then, harmonics in excess of the theoretical harmonic spectrum will be created.

However, a perfect tan 15° is not obtainable with a low number of turns in the transformer. Table I illustrates for specific numbers of turns for secondary windings $A_1$, $A_2$, $B_1$, $B_2$, $C_1$ and $C_2$, some practical tap turns and the resulting ratios.

TABLE I

| No. Tap Turns | No. Total Sec. Turns | Turns Ratio | Resultant Angular Displacement | % Angular Error |
|---|---|---|---|---|
| 3 | 11 | .273 | 30.59°/29.41° | ± 1.97% |
| 4 | 15 | .2666 | 30.16°/29.84° | ± .53% |
| 5 | 19 | .263 | 30.59°/29.4° | ± 1.97% |
| 6 | 23 | .261 | 30.87°/29.13° | ± 2.90% |
| 7 | 26 | .269 | 30.16°/29.84° | ± .53% |

It appears that tan 15° can be well approximated, with the best approximation obtained with a 4 to 15 turns ratio resulting in a minimum angular error of ±0.53% and in only infintesimal amplitude error. The effect on distortion and ripple of this error is imperceptible. By comparison, it is observed that the best turns ratio for such low turn-number domain available to implement the delta-wye scheme of FIG. 1 is 19/11 which has been found to result in a 0.28% amplitude error and a corresponding 6-pulse peak-to-peak dc voltage ripple.

With winding combinations such as 15, 19 and 23 turns on Table I, for the delta winding system the peak-to-peak ripples are in excess of 1%, in fact in most instances in excess of 2.3%, which is quite high considering that the theoretical peak-to-peak ripple of a 12-pulse scheme is 3.4%.

Thus, the hexagon transformer/rectifier scheme of FIG. 3 can be implemented with a single three-phase transformer having two identical secondary windings per phase (such as $A_1$, $A_2$) between which the associated primary winding (such as A) can be sandwiched. This makes a symmetrical construction possible, resulting in well matched voltages and leakage reactances even if low voltages are required. Consequently, the proposed scheme is likely to display significantly lower non-canonical distortion levels than the state-of-the-art solutions.

An important consequence of such symmetrical coupling of primary and secondary windings is a well-matched set of transformer leakage reactances which will not introduce non-canonical harmonics.

In addition, the winding arrangement and associated rectifier scheme according to the present invention make more effective use of the leakage reactances of the rectifier transformer to reduce line current harmonics to desired levels. Analysis shows that the hexagon scheme can accomplish the harmonic reduction with significantly less per unit leakage reactance than for instance the delta-wye scheme of FIG. 1. Thus, it has been found that in general, commutation overlap attenuates line current harmonics and reduces output voltage ripple. The greater the overlap, the greater the effects observed on harmonics and ripple. In this regard, the attenuation of line current harmonics, particularly with the 12-pulse series, is much more effective than the reduction of ripple.

It was noticed that a 12-pulse converter based on the hexagon scheme according to the present invention can meet the input line harmonic specifications without filtering if the transformer reactance is greater than about 0.15 per unit, or 15%. In contrast, a 12-pulse converter based on two phase displaced 6-pulse bridges fed by delta and wye windings on a transformer, such as in FIG. 1 (or any other winding combination giving 30° phase shift between the AC supplies for the bridges) needs considerably greater transformer reactance to achieve the same low levels of input harmonic currents.

The reason for the differences in performance between hexagon and delta-wye schemes is simple and fundamental. The hexagon uses 6-pulse mid-point commutating groups while the delta-wye (or any two-bridge arrangement) uses 3-pulse mid-point commutating groups. Under given loading with the same DC output voltage and the same per unit source reactance, the commutation overlap in a 6-pulse group is greater than that in a 3-pulse group because the available commutating voltage is lower, namely by a factor of $1/\sqrt{3}$). This larger overlap results in greater attenuation of line current harmonics.

The hexagon scheme being an inherently balanced 12-pulse scheme which leads to very little residual 6-pulse content in the input line current, is definitely superior to the delta-wye scheme which, because it is not inherently balanced due to the irrational turns ratio $\sqrt{3}$ needed to produce matched voltage sets, cannot be realized in a practical transformer. It is further observed that, although the nominal transformer KVA rating of the traditional scheme shown in FIG. 1 is 1.03 times the DC KW output, and the scheme according to FIG. 3 utilizes a transformer which may well have an about 10% higher KVA rating, nevertheless, since no interphase reactor is required, the overall size of the magnetics will actually turn out to be smaller.

While the invention is valid equally with diodes as with thyristors, when thyristors are used the rectifier devices can be placed either in all locations as shown in FIGS. 3 and 4, or only on one of the two DC busses, in which case, the rectifying circuit is in fact a semiconverter, which, in return for the simplification, will require some allowances in performance requirements.

I claim:

1. In a system for converting three-phase alternating current (AC) power into direct current (DC) derived between a positive and a negative DC output terminal, the combination of:
   a transformer having, (1) three primary windings connected to the respective phases of said AC power; (2) six identical secondary windings connected into a closed regular hexagon, with two secondary windings for one primary winding; (3) a total of twelve taps on said secondary windings distributed at substantially identical central angles on said regular hexagon, with a pair of taps for each secondary winding;
   a rectifier circuit having twelve rectifier devices operatively connected in two groups, one positive group to the positive DC output terminal and one negative group to the negative DC output terminal; with one tap of each pair of taps of a winding being associated with one rectifier of one group, the other tap being associated with a rectifier of the other group.

2. The system of claim 1 with each one of said primary windings being wound coaxially between the associated two secondary windings.

3. The system of claim 1 with said taps of a pair defining substantially a $\sqrt{3} \tan 15°$ ratio between the symmetrically tapped turns and the total number of turns of the associated secondary winding.

4. The system of claim 1 with the number of turns of each of said secondary windings being to the section of symmetrically tapped turns in the ratio of eleven to five.

5. The system of claim 1 with the number of turns of each of said secondary windings being to the section of symmetrically tapped turns in the ratio of fifteen to seven.

6. The system of claim 1 with the number of turns of each of said secondary windings being to the section of symmetrically tapped turns in the ratio of nineteen to nine.

7. The apparatus of claim 1 with the number of section of symmetrically turns of each of said secondary windings being to the tapped turns in the ratio of twenty-three to eleven.

8. The system of claim 1 with the number of turns of each of said secondary windings being to the section of symmetrically tapped turns in the ratio of twenty-six to twelve.

9. The system of claim 1 with each of said rectifier devices being a diode.

10. The system of claim 1 with each of said rectifier devices being a thyristor.

11. The system of claim 10 with at least one thyristor device being associated with one tap of a pair and one DC output terminal, the other tap of a pair being associated with the other DC output terminal through a diode device, thereby to form a semiconverter system.

12. The apparatus of claim 10 or 11 with means for controlling the firing angle of each thyristor.

13. In a system for converting three-phase alternating current (AC) power into direct current (DC) derived between a positive and a negative DC output terminal, the combination of:
   three identical transformers each having, (1) one primary winding connected to one of the respective phases of said AC power; (2) two identical secondary windings; (3) two symmetrically disposed taps on said secondary windings with said secondary windings being connected from one transformer to another so as to form a regular hexagon;
   a rectifier circuit having twelve rectifier devices operatively connected in two groups, one positive group to the positive DC output terminal and one negative group to the negative DC output terminal; with one tap of each pair of taps of a winding being associated with one rectifier of one group, the other tap being associated with a rectifier of the other group.

* * * * *